United States Patent [19]

Suzuki et al.

[11] Patent Number: 4,790,939
[45] Date of Patent: Dec. 13, 1988

[54] METHOD OF IMPROVING SVI OF MIXED LIQUOR IN AERATION TANK

[75] Inventors: Akira Suzuki, Saitama; Norio Watanabe, Kanagawa; Masashi Kage, Tokyo, all of Japan

[73] Assignee: Shinryo Corporation, Tokyo, Japan

[21] Appl. No.: 875,626

[22] Filed: Jun. 18, 1986

Related U.S. Application Data

[63] Continuation-in-part of Ser. No. 649,804, Sep. 12, 1984, abandoned.

[30] Foreign Application Priority Data

Oct. 4, 1983 [JP] Japan .................. 58-185488

[51] Int. Cl.⁴ .................. C02F 3/12; C02F 11/14
[52] U.S. Cl. .................. 210/608; 210/625; 210/631; 210/705
[58] Field of Search ............ 210/622, 625, 631, 727, 210/733, 608, 609, 703–705

[56] References Cited

U.S. PATENT DOCUMENTS

| | | | |
|---|---|---|---|
| 3,341,632 | 7/1967 | Gregor et al. | 210/625 X |
| 3,386,910 | 6/1968 | Forrest | 210/625 X |
| 3,787,316 | 1/1974 | Brink et al. | 210/625 X |
| 3,959,124 | 5/1976 | Tchobanoglous | 210/625 X |
| 4,046,684 | 9/1977 | Tsunoda et al. | 210/727 X |
| 4,452,699 | 6/1984 | Suzuki et al. | 210/625 X |
| 4,481,115 | 11/1984 | Wade et al. | 210/727 |
| 4,559,143 | 12/1985 | Asada et al. | 210/727 X |

FOREIGN PATENT DOCUMENTS

| | | |
|---|---|---|
| 72214 | 2/1983 | European Pat. Off. |
| 3107148 | 9/1982 | Fed. Rep. of Germany |
| 2102784 | 2/1983 | United Kingdom |

Primary Examiner—Tom Wyse
Attorney, Agent, or Firm—Wolf, Greenfield & Sacks

[57] ABSTRACT

A method for improving the SVI of the mixed liquor residing in an aeration tank in an activated sludge treatment system which also includes a sedimentation tank is provided. This method comprises the following steps:

(A) feeding a concentration system other than said activated sludge treatment system with at least one of the mixed liquor in the aeration tank, the mixed liquor withdrawn from a line connecting the aeration tank and the sedimentation tank, and the settled sludge leaving said sedimentation tank;

(B) introducing the concentrated sludge from said concentration system into a first mixing zone where said concentrated sludge is mixed with a resin having high water absorbing capability;

(C) introducing a gel-like sludge-resin mixture from said first mixing zone into a second mixing zone where a metal salt is added to said mixture; and (D) returning to said aeration tank a contracted gel-sludge mixture leaving said second mixing zone.

3 Claims, 1 Drawing Sheet

METHOD OF IMPROVING SVI OF MIXED LIQUOR IN AERATION TANK

RELATED APPLICATION

This application is a continuation-in-part of U.S. patent application Ser. No. 649,804 filed Sept. 12, 1984, now abandoned.

BACKGROUND OF THE INVENTION

The present invention relates to a method of improving the SVI of a mixed liquor in an aeration tank in an activated sludge treatment system.

Sewage and other wastewaters containing organic matter are currently treated by the activated sludge process. Activated sludge treatment systems often experience "bulking", a phenomenon wherein the sludge settles poorly in a sedimentation tank because of a floc of low density. When bulking occurs, the concentration of solids in the sludge being withdrawn from the sedimentation tank is decreased, and the resulting decrease in the solids concentration in an aeration tank causes overloading and makes the aeration treatment difficult. As a further problem, part of the sludge overflows the sedimentation tank to impair the quality of the clarified water.

Conventional methods for dealing with bulking include increasing the volume of aerating air, and providing a water holding tank before the aeration tank for operating it under uniform load. If these methods prove ineffectual, a filamentous fungi sterilizer such as chlorine, copper compounds, ozone or chloroform is added to either the aeration tank or the return sludge; or a flocculant is added to agglomerate the sludge solids.

Bulking is an unpredictable phenomenon and its prevention requires an uninterrupted addition of the sterilizer or flocculant. However, addition of these chemicals for an extended period leads to an increased operating cost. Furthermore, the sterilizer acts not only on the specific filamentous fungi but also on the flora of microorganisms in the treatment system, and hence, the sterilizer added in an excessive amount reduces the activity of the microorganisms and impairs the quality of the clarified water.

In commonly assigned Japanese Patent Public Disclosure No. 184493/82, the present inventors proposed an improve method for preventing bulking without incurring the problems with the conventional techniques. This method comprises feeding a concentration system other than the activated sludge treatment system with at least one of the mixed liquor in an aeration tank, the mixed liquor withdrawn from a line connecting the aeration tank and the sedimentation tank, and the settled sludge, and returning to the aeration tank a concentrated sludge of higher solids content leaving the concentration system and, optionally, separated water of lower solids content also leaving said concentration system. The concentrated sludge returned to the aeration tank is dispersed in that tank, but 12 to 24 hours later, the sludge returns to its initial (unconcentrated) state. Even if the concentrated sludge is returned to the aeration tank after it is concentrated to a higher density with a roll press dehydrator or any other suitable device, the sludge returns to the unconcentrated state in about 36 hours. Therefore, in order to improve the SVI of the mixed liquor in the aeration tank by the method of Japanese Patent Public Disclosure No. 184493/82, at least 5 wt% of the total solids content of that liquor must be concentrated and returned within a short time.

SUMMARY OF THE INVENTION

The primary object of the present invention is to provide a method that is free from the defects of the conventional technique and which is capable of maintaining activated sludge in a highly settleable state for an extended period.

The method of the present invention for improving the SVI of the mixed liquor residing in an aeration tank in an activated sludge treatment system which also includes a sedimentation tank comprises the following steps:

(A) feeding a concentration system other than said activated sludge treatment system with at least one of the mixed liquor in the aeration tank, the mixed liquor withdrawn from a line connecting the aeration tank and the sedimentation tank, and the settled sludge leaving said sedimentation tank;

(B) introducing the concentrated sludge from said concentration system into a first mixing zone where said concentrated sludge is mixed with a resin having high water absorbing capability;

(C) introducing a gel-like sludge-resin mixture from said first mixing zone into a second mixing zone where a metal salt is added to said mixture; and (D) returning to said aeration tank a contracted gel-sludge mixture leaving said second mixing zone.

DESCRIPTION OF THE PREFERRED EMBODIMENTS

Figure 1:
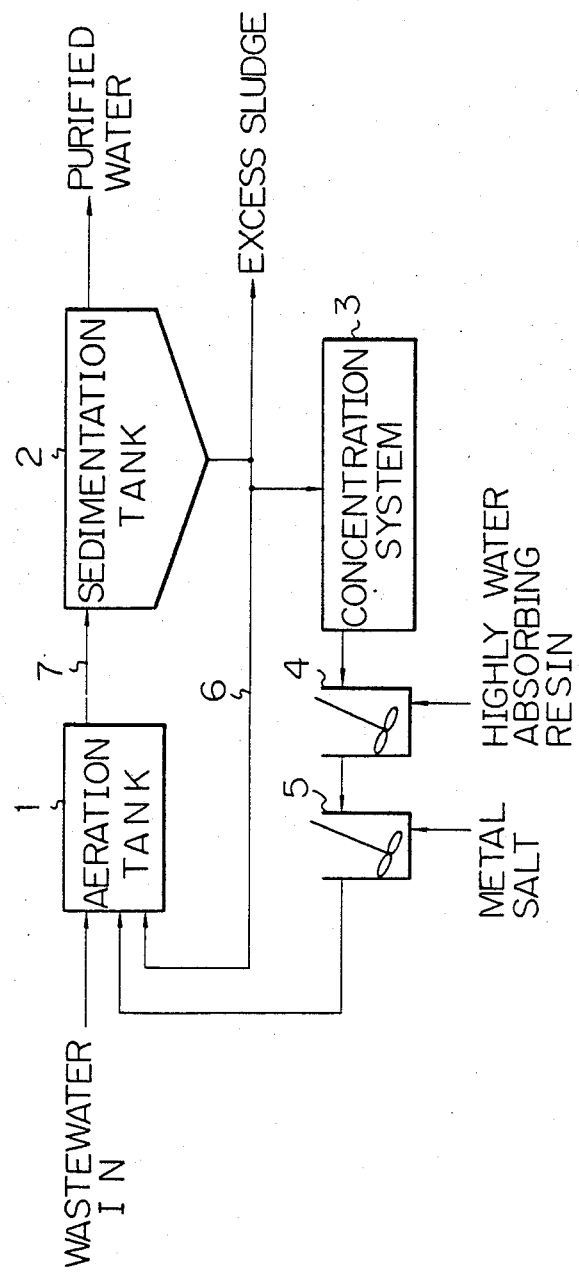
FIG. 1 is a flowsheet illustrating the method of the present invention.

The concentration system used in the present invention is an atmospheric flotation concentrator, a pressurized flotation concentrator, a pressurized flotation concentrator, a centrifugal concentrator or a roll press type dehydrator or a combination thereof. An atmospheric flotation concentrator is a preferred concentration system. This type of concentrator comprises a foaming device blowing air into a liquid phase containing a flocculant and a foaming agent at atmospheric pressure; a mixing device for mixing the bubbles evolved in said foaming device with at least one of the mixed liquor in the aeration tank, the mixed liquor withdrawn from a line connecting the aeration tank and the sedimentatin tank, and the settled sludge leaving the sedimentation tank; and a flotation tank for separating the mixture into a concentrated sludge and water. The solids in the mixed liquor or settled sludge are concentrated by flotation as they are absorbed on the bubbles. An organic flocculant commonly employed in the art may be used in the present invention, and a cationic polymeric flocculant is preferred. Satisfactory results may be obtained by using 10–20 ppm of the flocculant, and a smaller amount will do if the sludge is highly amenable to concentration by flotation. An ordinary surfactant may be used as the foaming agent, and a biodegradable type is preferred in consideration of the fact that the foaming agent enters the aeration tank when the concentrated sludge is returned thereto. An example of the preferred foaming agent is a surfactant having a straight hydrocarbon chain in its molecule. The amount of the foaming agent added varies with its type, but satisfactory results are obtained within the range of 10–20 ppm.

Preferably, sludge corresponding to at least 5% of the total solids content of the mixed liquor in the aeration tank is concentrated in the concentration system. The concentrated sludge obtained in the atmospheric flotation concentrator generally has a solids content of 6–8 wt%. Another concentration system that may be employed in the present invention is a roll press type dehydrator. The construction of the roll press dehydrator is well known in the art and its main components are pressure rollers and filter cloth. Sludge as sandwiched between two sheets of the filter cloth in an endless belt form is squeezed by pressure rollers in contact with the cloth. Water separating from the sludge passes through the filter cloth and is discharged from the bottom of the dehydrator. The concentrated sludge is carried by the running belt of the filter cloth and is subsequently separated therefrom.

The solids content of the concentrated sludge leaving the concentration system is not limited to any particular value, but a preferred content is 1 wt% or more, and the most preferred value is 4 wt% or more. As already mentioned, the solids content of the sludge flowing into the concentration system is preferably at least 5 wt% of the total weight of the solids in the mixed liquor in the aeration tank.

The resin having high water absorbing capability used in the present invention is selected from among "functional" polymers and has the ability to absorb water in an amount a few hundred times as heavy as its own weight. Typical examples of the resins used in the present invention include polyvinyl alcohols crosslinked by an ionizing radiation (see Japanese Patent Public Disclosure No. 55647/75); crosslinked alkali metal acrylate polymers which are prepared by polymerizing a concentrated alkali metal acrylate dispersed in a solvent of aliphatic hydrocarbons without the presence of a crosslinking agent (see Japanese Patent Public Disclosure No. 46389/78); starch-acrylonitrile graft copolymers hydrolized to convert the nitrilegroups to carboxyl and amide groups; crosslinked acrylamide polymers hydrolized with an alkali metal hydroxide to convert the carboxamide groups to alkali metal carboxylate groups (see U.S. Pat. No. 3,247,171); and polyalkylene oxides crosslinked by an ionizing radiation (see Japanese Patent Publication No. 27039/73). These resins are water-insoluble but water-swellable. Poly-(acrylic acid) salts are particularly advantageous for use in the present invention. These resins of high water absorption may be used in various forms such as powder, fiber and particles. The ability of these resins to absorb water varies with their main components and use conditions, but they are able to absorb 50 to 1,000 times their own weight of water. The amount of these resins that is advantageous for the purpose of the present invention ranges from one hundredth to one thousandth of the weight of the concentrated sludge.

Any of the known mixing means may be employed in the first mixing zone. The mixing period should be such that the concentrated sludge and the highly water absorbing resin are intimately mixed to provide the desired gel-like product.

The metal salt used in the second mixing zone is a salt of monovalent metals such as sodium and potassium, or a salt of divalent metals such as calcium and magnesium, or a salt of trivalent metals such as aluminum. The anion as one component of the metal salt may be a chloride ion, sulfate ion, nitrate ion, carbonate ion or a bicarbonate ion. Salts of divalent metals are preferred, and calcium chloride is particularly advantageous. The metal salt is preferably added in an amount between one half the weight of and the total weight of the highly water absorbing resin.

The method of the present invention is hereunder described in greater detail by reference to FIG. 1 which is a flowsheet for the apparatus used in implementing this method. As shown, the apparatus comprises an aeration tank 1, a sedimentation tank 2, a concentration system 3, a first mixing zone 4 and a second mixing zone 5. A wastewater fed into the aeration tank 1 is subjected to treatment with activated sludge; the water then enters the sedimentation tank 2 where it is separated into a settled sludge and a supernatant; the supernatant is either discharged into water-courses as clarified water or subjected to further treatment; part of the settled sludge is returned to the aeration tank 1 through a line 6 and the other part of the sludge is withdrawn out of the system as excess sludge.

When bulking occurs, part of the settled sludge is separated from line 6 and introduced into the concentration system 3. instead of the sludge, the mixed liquor in the aeration tank may be introduced into the concentration system either directly from the aeration tank or from a line 7 connecting the aeration tank and the sedimentation tank.

In the concentration system, the settled sludge or the mixed liquor is concentrated to produce a concentrated sludge and separated water; the concentrated sludge is sent to the first mixing zone 4 whereas the separated water may be returned to the aeration tank.

In the first mixing zone 4, the concentrated sludge is mixed with the resin having high water absorbing capability. The resin which absorbs the water in the concentrated sludge swells and forms a gel. The gel entrains the solids in the concentrated sludge, thereby forming a gel-like sludge-resin mixture.

In the second mixing zone 5, the gel-like sludge-resin mixture is incorporated with a metal salt, which reacts with the resin to block the negative charges on the resin surface. This causes a decrease in the pressure of gel-maintaining hydrogen ions, and as a result, the gel contracts itself. For example, an acrylic resin reacts with calcium chloride in the second mixing zone as follows:

$$-COO^- + Ca^{2+} \rightarrow (COO)_2Ca$$

$$H^+ + Cl^- \rightarrow HCl$$

The contracting gel entrains solids in the sludge. Therefore, the sludge incorporated in the contracted gel is highly settleable.

The so prepared mixture of contracted gel and sludge has such a high settleability that it can reside within the aeration tank for more than 100 hours without causing bulking. The purifying capability of sludge is equal to that of the ordinary activated sludge. The highly water absorbing resin will cause no adverse effects on the activated sludge used in the present invention.

The sludge volume index (SVI) is commonly used to give a guide figure for the settleability of sludge in the mixed liquor in the aeration tank; the SVI is expressed as follows:

$$SVI\ (ml/g) = \frac{\text{volume in milliliters of sludge settled from a 1,000-ml sample in 30 min.}}{\text{solids content of mixed liquor in grams per liter}}$$

A normal, highly settleable sludge has a SVI between 50 and 100, but if bulking occurs, the SVI value increases to between 200 and 400.

A working example of the present invention is shown below, and in the example, the sludge settleability was evaluated in terms of SVI.

EXAMPLE

The mixed liquor in the aeration tank (SVI, 210 ml/g; MlSS, 3,300 mg/1,000 ml) was concentrated by atmospheric flotation concentrator to a solids content of 4 wt%. The resulting concentrated sludge (250 ml) was thoroughly mixed with 1 g of a polyacrylic acid resin to form a swollen gel. The gel was mixed with 1 g of calcium chloride and the mixture was agitated until the gel contracted itself. The contracted gel was mixed with 9,750 ml of the mixed liquor from the aeration tank to form sample 1. Another 250-ml sample of the concentrated sludge was mixed with 9,750 ml of the mixed liquor from the aeration tank to form sample 2. Both samples were subjected to aeration and the change in their SVI values was checked at given intervals. The results are shown in the following table.

| Aeration time (h) | SVI (ml/g) Sample 1 | Sample 2 |
|---|---|---|
| 1 | 103 | 106 |
| 12 | 103 | 106 |
| 24 | 106 | 109 |
| 36 | 106 | 152 |
| 48 | 106 | 210 |
| 72 | 109 | 210 |

As the above table shows, sample 1 produced by the present invention maintains a high settleability for an extended period as compared with sample 2 produced by the conventional methods.

EFFECT OF THE INVENTION

According to the present invention, activated sludge in which bulking occurred is concentrated and is further treated with the resin having high-water absorbing capability to make the solids of the sludge a massive form. Therefore, the resultant sludge, though it is subjected to aeration for an extended period, is able to be maintained in a highly settleable state without incurring reccurrence of bulking.

We claim:

1. A method for improving the SVI of the mixed liquor residing in an aeration tank in an activated sludge treatment system which also includes a sedimentation tank, said method comprising the following steps:
   (A) feeding a concentration system other than said activated sludge treatment system with at least one of the mixed liquor in the aeration tank, the mixed liquor withdrawn from a line connecting the aeration tank and the sedimentation tank, and the settled sludge leaving said sedimentation tank;
   (B) introducing the concentrated sludge from said concentration system into a first mixing zone where said concentrated sludge is mixed with a polyacrylic acid resin which is able to absorb from 50 to 1000 times its own weight of water;
   (C) introducing a gel-like sludge-resin mixture from said first mixing zone into a second mixing zone where calcium chloride is added to said mixture thereby causing the gel to contract; and
   (D) returning to said aeration tank a contracted gel-sludge mixture leaving said second mixing zone.

2. A method according to claim 1 wherein said concentration system is an atmospheric flotation concentrator comprising a foaming zone for introducing a flocculant, a foaming agent and air into a liquid phase at atmospheric pressure; a mixing zone for mixing the bubbles evolved in sai foaming zone with at least one of the mixed liquor in the aeration tank, the mixed liquor withdrawn from a line connecting the aeration tank and the sedimentation tank, and the settled sludge leaving the sedimentation tank; and a flotation zone for separating the mixture into a concentrated sludge and water.

3. A method according to claim 1 wherein said concentrated sludge has a solids content of 4 wt% or more.

* * * * *